Sept. 18, 1945.   M. M. MARISIC   2,385,217
GEL PELLETS
Filed Oct. 9, 1942
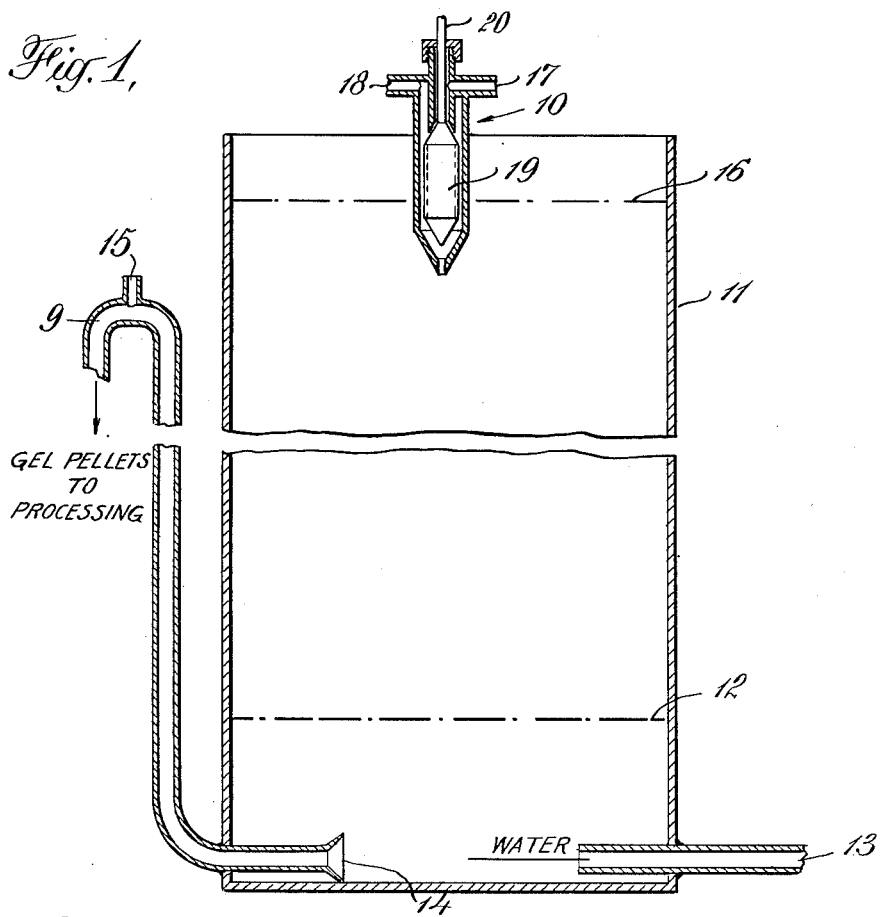
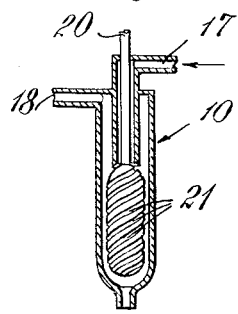
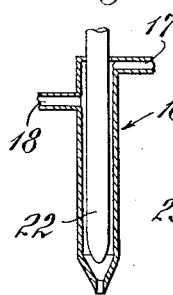
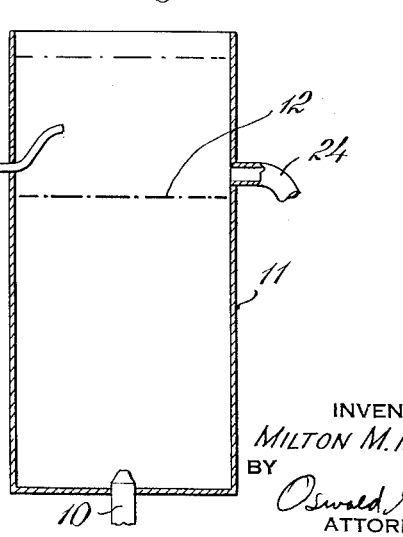
INVENTOR
MILTON M. MARISIC
BY
Oswald G. Hayes
ATTORNEY Patented Sept. 18, 1945

2,385,217

UNITED STATES PATENT OFFICE 2,385,217

GEL PELLETS

Milton M. Marisic, Woodbury, N. J., assignor to Socony-Vacuum Oil Company, Incorporated, a corporation of New York Application October 9, 1942, Serial No. 461,454

1 Claim. (Cl. 252—317)

This invention relates to a process of forming pellets of gels and is particularly concerned with such pellets in which the gel structure is retained in a final pellet having good hardness and resistance to breakage by shock.

One of the principal uses for gel pellets at the present time is in the catalytic cracking of heavy hydrocarbons to lighter material of the nature of gasoline by contact with a silica gel which preferably also contains another metal oxide such as alumina. In such operations, the term "gel" has been rather loosely applied to include both true gels and gelatinous precipitates. In forming pellets of either, the gel or precipitate is caused to form completely and is then subjected to suitable operation for the formation of particles. These have not been particularly satisfactory because the particles obtained are not resistant to losses by shock breakage and abrasion. The common operations include breaking a mass of gel to fragmentary particles and screening to separate particles of desired size. This results in the production of a considerable amount of fines which are a loss since they cannot be used in present catalytic equipment. In some cases, the wet gel is molded. This requires expensive molding equipment and costly cleaning of molds. It is also proposed (Reissue Patent 21,690) to separate the mass into two parts, one of which is dried and crushed and the other used wet to bind the crushed portion in a molding operation which involves the usual objections to molding.

This invention has for its purpose a method of preparing gels which eliminates the heretofore necessary step of converting formed gel masses into a usable form by some type of pelleting operation. Another object of this invention is to produce gel contact masses in spherical and/or spheroidal shapes. This form is ideal for any process in which a contact bed is utilized, whether it be of the stationary or the moving (or flowing) type of bed. Spherically-shaped particles can pack only in a uniform manner, hence channeling of vapors or fluids flowing through this type of bed is impossible. For an operation in which a moving (or flowing) contact bed is employed, pellets of a spherical shape afford unique flow characteristics.

This invention involves continuously contacting within an enclosed mixing chamber such as an injector or nozzle mixer, streams of reactant solutions of such concentrations and proportions that no gelation occurs within the mixer, but only at some predetermined time after leaving the mixer, and under such conditions of flow that each stream is completely and uniformly dispersed within and throughout the other at the instant of contact. The resulting colloidal solution is ejected from the mixer through orifice or orifices of suitable size so as to form globules of the solution which are introduced into a fluid medium where the globules of the colloidal solution set to a gel before they pass out of that medium. The fluid medium may be any liquid or combination of liquids which is immiscible with water such as, for example, petroleum naphtha, kerosene, hydrocarbon oils, etc.

There are two alternative methods of operation which are dependent upon the density of the fluid employed. When the density of the fluid is lower than that of water, the fluid is supported over a layer of water and the colloidal solution from the mixer is introduced at the top of the column of fluid; the height of the latter and the gelation time being adjusted so that gelation occurs within the fluid and before the globose particles reach the water surface. For a fluid more dense than water, the procedure is reversed; the colloidal solution is ejected into the bottom of the fluid, the globules rise up through the fluid, gel and pass into a layer of water which conducts the gel away for processing.

The shapes of the formed gel are dependent upon the rate at which the globules of the colloidal solution travel through the water-immiscible liquids; while the rate of movement of the globules depends upon the relative density and viscosity of the fluid medium employed. If the latter medium has a low viscosity and a density far removed from that of the colloidal solution, the globules of the latter solution will travel rapidly, hence the gel pellets will assume flat or disc-like shapes. Examples of liquids in which pellets of this type may be produced are benzene, carbon tetrachloride, or petroleum naphtha. A water-immiscible fluid medium having a high viscosity or a density close to that of the colloidal solution will effect slow movement of the globules of the latter solution and thus form spherically-shaped gel gellets. It is apparent from the above description that gel pellets of any shape, varying from flat-like discs to perfect spheres, may be manufactured by choice of a water-immiscible fluid medium having the proper density and viscosity.

The success of this process is due to the fact that the gelation time for a large number of materials can be controlled very accurately. A method of preparing silica-alumina gels is described in my copending application Serial No. 461,455, filed October 9, 1942.

I have studied the preparation of many gels in which silica is the predominant component and found that the gelation time can be controlled so that the invention described above may be utilized in their preparation. The following is a list of the gels I have prepared by the methods described herein: silica gel, silica-alumina, silica-stannic oxide, silica-ceria, silica-thoria, silica, alumina-thoria, silica-alumina-stannic oxide, silica-alumina-ceria. Further, the methods described herein may be extended to the preparation of many other types of gels.

The time of gelation is dependent upon temperature, pH and concentrations of reactants. The higher the temperature, the shorter the time of gelation. At fixed concentrations of reactants the gelation time increases with decrease in pH provided the pH is within the limits of the invention. When the temperature and pH are constant, the gelation time decreases as the reactant solutions are made more concentrated.

A number of variations in the methods described above may be employed which are to be considered within the scope of this invention. For example, it may be desired to mix the reactant solutions at such concentrations that gelation occurs, say, at one minute after the solution leaves the mixing chamber. This would require a rather long column of fluid medium in order that gelation takes place in the fluid, but a considerably shorter column may be used by simply increasing the temperature of the fluid medium so that the time of gelation is decreased.

Suitable apparatus for the practice of my process is shown in the annexed drawing wherein:

Figure 1 is a section through a preferred form of the apparatus;

Figure 2 shows a modified type of a mixing nozzle;

Figure 3 is an illustration of a very simple mixing nozzle; and

Figure 4 is a view of a modified form of apparatus according to the invention.

Referring to Figure 1, a mixing nozzle indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlets 14 and 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit, but only one is shown here for purposes of simplicity. The nozzle 10 includes means for completely dispersing two solutions in each other and admitting a continuous stream of the so-formed colloidal solution below the surface 16 of the water immiscible fluid, wherein the stream of the colloidal solution breaks up into globules. The colloidal solution or globules thereof may be dropped on the surface of the fluid but this tends to break them and impairs control over pellet size obtained by injecting the colloidal solution under the surface of the liquid. It must be borne in mind, that considerable shrinkage takes place, not only by syneresis, but also during drying and processing. Control of globule size must take into account this shrinkage.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

In the mixing nozzle 10, solutions to be mixed are metered accurately and then admitted through lines 17 and 18 to a chamber which has a rotor 19 rotated by shaft 20 at a speed of at least about 1700 R. P. M. from a source of power not shown. The rotor 19 is constructed from a rectangular bar of metal whose edges are rounded off in such manner that the walls of the mixing chamber serve as a guide for them. The rounded edges of the rotor are grooved; thus efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the rates of the reactant solutions are so high that the time the latter solutions spend in the mixing chamber is only a very small fraction of the gelation time.

A further modification is the extremely simple mixer of Figure 3, wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

A peculiar feature of the present gel pellets is their transparency; they having the appearance of clear glass beads, in many cases. This glassy appearance is retained only when silica is predominant, the transparency being lost as content of other oxides is increased. For example, 25% thoria or 12.5% alumina are about the upper limits for glassy appearance of silica-thoria and silica-alumina gels, respectively, when prepared from colloidal solutions having a pH below 8. At a pH above 8 white gels are produced, even from pure silica.

The present pellets are extremely hard and, due to this property and their smooth surfaces, are capable of resisting losses by attrition and shock in handling for periods many times longer than the molded pellets used heretofore.

*Example I*

A solution of sodium silicate containing 105 grams of $SiO_2$ per liter was prepared by diluting "N" brand of sodium silicate (28.7% $SiO_2$, 8.9% $Na_2O$). This solution was mixed with a second solution containing 34.10 grams of $Al_2(SO_4)_3$ and 25.05 grams of $H_2SO_4$ per liter at the ratio of 1.00 volumes of the former solution to 0.780 volume of the latter. The resulting colloidal solution leaving the mixer through orifices was introduced into the top of a column of gas oil whose depth was eight feet. The globules of solution fell through the oil and gelled before passing into the layer of water located beneath the oil. The gel in the globular form was conducted out of the bottom of the column in a stream of water and on removal from the water, it was washed with petroleum naphtha to remove oil from its surface. It was then washed with water and $NH_4Cl$ solution to replace zeolitically-held sodium ions by ammonium ions which are capable of being driven off as $NH_3$ gas by heat. The gel was dried slowly and uniformly at 180° F. until shrinkage was substantially complete and the drying was continued at a gradually increasing temperature up to 1050° F. at which temperature it was maintained for two hours. The silica-alumina gel retained its spheroidal shape during the washing and drying operations.

The time of gelation for the concentrations and proportions of reactants given above was about ten seconds, while the pH was 6.9. The gas oil employed was a fraction of Oklahoma City gas oil having a boiling range of 471° to 708° F. and a specific gravity of 0.846.

*Example II*

This example illustrates the use of chlorobenzene as a fluid medium and the mixing of reactants at such concentrations and proportions that the gelation time was approximately twenty seconds, while the pH was 6.9. Since chlorobenzene has a density of 1.101, the colloidal solution was ejected into the bottom of a ten-foot column of chlorobenzene (see Fig. 4), the globules of solution rose through the fluid and gelled before passing into a layer of water contained over the chlorobenzene. The gel was washed and dried as described in Example I (the washing with petroleum naphtha was unnecessary here).

The sodium silicate solution contained 105 grams of $SiO_2$ per liter (prepared from "N" brand sodium silicate) while the second solution contained 27.10 grams $Al_2(SO_4)_3$ and 19.95 grams of $H_2SO_4$ per liter. These solutions were mixed at the ratio of 1.00 volumes of the former solution to 0.980 volume of the latter.

*Example III*

This example illustrates the preparation of spherically-shaped silica gel pellets and the conversion of these into a cracking catalyst. The time of gelation for the concentrations and proportions of reactants given below was about thirty seconds while the pH was 5.7.

The apparatus shown diagrammatically in Figure 1 was employed in the manufacture of the silica hydrogel. A solution of sodium silicate containing 106.3 grams of $SiO_2$ and 33.0 grams of $Na_2O$ per liter, prepared by diluting "N" brand of sodium silicate, was metered accurately and admitted continuously to the mixing chamber by inlet 18 while a metered solution of 3.90 normal hydrochloric acid was continuously fed at inlet 17. The reactant solutions were mixed at a ratio of 3.34 volumes of the sodium silicate solution to 1.00 volume of the acid solution. The resulting colloidal solution leaving the mixer entered at the top of a nine-foot column of petroleum oil having a viscosity of 305 Saybolt seconds and a density of 0.891. The globules of solution fell through the oil and gelled before passing into the layer of water located beneath the oil. The spherically-shaped hydrogel was conducted out of the bottom of column 11 in a stream of water by means of conduits 14 and 9. The hydrogel was washed with benzene to remove the film of oil and then washed with water until free of sodium chloride. The washed hydrogel was soaked over night in a 25% solution of $Al(NO_3)_3 \cdot 9H_2O$ and then the excess solution was poured off. The spherically-shaped silica hydrogel impregnated with aluminum nitrate was dried slowly at 180° F. until shrinkage was substantially complete and the drying was continued at a gradually increasing temperature up to 1050° F. at which temperature it was maintained for two hours. The aluminum nitrate was converted to the oxide during the heating process, and thus a silica-alumina gel catalyst in the form of spherically-shaped pellets was obtained, having good activity as a cracking catalyst.

The hydrogel globules prepared in Examples 1, 2 and 3 were of about 5 millimeters in diameter and no difficulty was encountered in drying and shrinking these to their final form. It has been found, however, that with hydrogel globules of the order of 8 or 10 millimeters in diameter considerable cracking and splitting of the globules takes place during the drying and shrinking period unless the globules are treated with boiling water or steam for at least 15 to 30 minutes prior to drying.

The spherical pellets of Example 1 have been compared by hardness tests to pellets formed in conventional manner. A comparison on cracking efficiency shows the present pellets to have substantially the same effect as molded pellets and broken fragments. A silica-alumina hydrogel was prepared by mixing reagents of the same concentration and in the same proportions as in Example 1. This was permitted to gel as a mass in conventional manner.

The hydrogel, after being washed, was divided into two portions, the one part was dried, then crushed to produce fragmentary pieces of the desired size; the other portion of the hydrogel was cast into molds and dried, thus forming small cylindrical pellets. These two forms of gel were subjected to a hardness test developed for cracking catalysts which consists of tumbling an 80 cc. sample of material in a one-pound grease can with one ⅜" x 3¼" Monel metal rod at 80 R. P. M. on a paint roller mill for a period of one hour, then screening the sample to determine the quantity which has powdered and broken down to a size smaller than the original. The fragmentary pieces of gel showed a breakdown of 12%, while the cylindrical pellets were broken down to the extent of 6%. The larger breakdown with the gel in the fragmentary form is probably due to the irregular shapes and to the stresses and fissues developed during the crushing operation.

The spherically-shaped gel of Example 1 under the above conditions of hardness test gave no powdering nor breakdown. Continuing the test for an additional 15 hours, merely scratched the surface of the spheres, thus producing only a negligible amount of fines. Subjecting the gel to the hardness test for a total of eighty hours gave 0.3% of material which was smaller in size than the original.

The pellets of this invention may act as carriers for other material in the manner well known in the art.

I claim:

The process of forming spheroidal particles of inorganic oxide gel containing silica, which comprises flowing together and mixing a stream of sodium silicate and a stream of an acid solution to form a clear hydrosol free of gelatinous precipitate and capable of setting to a hydrogel without substantial change in chemical composition, immediately introducing said stream of hydrosol into a body of mineral oil overlying a body of water both maintained at a temperature below the boiling point of the sol, permitting the hydrosol to assume generally spheroidal shape and to fall as spheroidal globules through said oil body whereby spheroidal particles of hydrogel are formed in the oil and passed therefrom through the interface into the body of water, inducing flow of water through said body of water to thereby entrain and remove formed hydrogel spheroids, washing the hydrogel spheroids with water, and drying the washed spheroids.

MILTON M. MARISIC.